(12) United States Patent
Wei et al.

(10) Patent No.: US 10,495,965 B2
(45) Date of Patent: Dec. 3, 2019

(54) METHOD, EQUIPMENT AND SYSTEM FOR ACHIEVING SHORT FOCAL LENGTH CIRCULAR-SCREEN OUTPUT BASED ON MULTIPLE OPTICAL MACHINES

(71) Applicant: Hangzhou YiYuQianXiang Technology Co., Ltd., Hangzhou (CN)

(72) Inventors: Pingting Wei, Hangzhou (CN); Ruizi Qin, Hangzhou (CN)

(73) Assignee: HANGZHOU YIYUQIANXIANG TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 15/979,404

(22) Filed: May 14, 2018

(65) Prior Publication Data
US 2018/0364559 A1 Dec. 20, 2018

(30) Foreign Application Priority Data
May 12, 2017 (CN) .......................... 2017 1 0336187

(51) Int. Cl.
*G03B 21/10* (2006.01)
*G03B 37/04* (2006.01)
(Continued)

(52) U.S. Cl.
CPC ............. *G03B 37/04* (2013.01); *G03B 21/10* (2013.01); *G03B 35/20* (2013.01); *H04N 9/317* (2013.01);
(Continued)

(58) Field of Classification Search
CPC ...... G03B 21/00; G03B 21/005; G03B 21/13; G03B 21/56; H04N 13/363
See application file for complete search history.

(56) References Cited

U.S. PATENT DOCUMENTS

| 2002/0015052 A1* | 2/2002 | Deering | G06T 3/0081 345/647 |
| 2013/0222557 A1* | 8/2013 | Kuo | G02B 27/225 348/54 |
| 2018/0275505 A1* | 9/2018 | Tao | G02B 5/02 |

FOREIGN PATENT DOCUMENTS

| CN | 1688160 A | 10/2005 |
| CN | 200997043 Y | 12/2007 |

(Continued)

*Primary Examiner* — Cara E Rakowski
*Assistant Examiner* — Magda Cruz
(74) *Attorney, Agent, or Firm* — Gokalp Bayramoglu (57) ABSTRACT

The present invention provides a projection method, equipment and system for achieving short focal length circular-screen output based on multiple optical machines. The projection method includes: setting a plurality of optical machines corresponding to one visual plane; calculating a value range of a throw ratio of the optical machines corresponding to the visual plane according to a percentage of a fusing zone formed when projection of the optical machines intersects each other and is projected to the corresponding visual plane and an expected screen ratio; obtaining setting parameters of each optical machine based on the value range of the throw ratio of each optical machine; and obtaining a spatial position and a rotation angle range for when the optical machines are projecting based on the setting parameters of the optical machines and a projection area of an optical path coverage range of the optical machines on the corresponding visual plane.

11 Claims, 9 Drawing Sheets

(51) Int. Cl.
   G03B 35/20 (2006.01)
   H04N 9/31 (2006.01)
   H04N 13/363 (2018.01)

(52) U.S. Cl.
   CPC ......... H04N 9/3147 (2013.01); H04N 13/363 (2018.05)

(56) References Cited

FOREIGN PATENT DOCUMENTS

| | | | | |
   |---|---|---|---|---|
   | CN | 101682715 A | | 3/2010 | |
   | CN | 205039917 U | * | 2/2016 | ............... H04N 5/74 |
   | CN | 205039917 U | | 2/2016 | |
   | CN | 106527024 A | | 3/2017 | |
   | CN | 207099262 U | | 3/2018 | |

* cited by examiner

Prior art

FIG. 1

S100 setting a plurality of optical machines corresponding to one visual plane

S101 according to a percentage of a fusing zone formed when projection of the optical machines intersects each other and is projected to the corresponding visual plane and an expected screen ratio, calculating a value range of a throw ratio of the optical machines corresponding to the visual plane

S102 obtaining setting parameters of each optical machine based on the value range of the throw ratio of each optical machine

S103 according to the setting parameters of the optical machines and a projection area of an optical path coverage range of the optical machines on the corresponding visual plane, obtaining a spatial position and a rotation angle range when the optical machines are projecting

METHOD, EQUIPMENT AND SYSTEM FOR ACHIEVING SHORT FOCAL LENGTH CIRCULAR-SCREEN OUTPUT BASED ON MULTIPLE OPTICAL MACHINES

CROSS REFERENCE TO RELATED APPLICATIONS

This Non-provisional application is based upon and claims priority under 35 § 119(a) on Chinese Application No. 201710336187.6, filed on May 12, 2017, the entire contents of which are hereby incorporated by reference.

TECHNICAL FIELD

The present invention relates to the technical field of imaging processing, and more particularly, to a projection method for achieving short focal length circular-screen output based on multiple optical machines, and projection equipment for achieving short focal length circular-screen output based on multiple optical machines and a CAVE system.

BACKGROUND

A cave automatic virtual environment (CAVE) projection system is a large virtual reality (VR) system, with high degrees of immersion and interactivity. The CAVE projection system can fuse vision, touch, sound and other senses, and can track head movement along 6 degrees of freedom. The principles of a CAVE immersive virtual reality display system are relatively complex. It is based on computer graphics, and perfectly fuses the high-resolution three-dimensional projection display technology, multi-channel visual synchronization technology, three-dimensional computer graphics technology, audio technology, sensor technology and so on. The CAVE immersive virtual reality display system is therefore able to produce a completely immersive virtual environment surrounded by a three-dimensional projection image sand can be used by multiple people. At present, real-time high-resolution multi-window content rendering of a complex scene is mainly applied to the CAVE system. The CAVE projection system is a large VR system with high degree of immersion and interactivity. The CAVE projection system is a highly immersive virtual demonstration environment composed three or more (i.e. including three) hard rear-projection walls. An observer is surrounded by the virtual reality system with a plurality of images, and a plurality of projection surfaces form a virtual space. The common CAVE system projection space is a standard cubic structure, and the four independent projection channels finally form a space continuous projection image.

Figure 1:
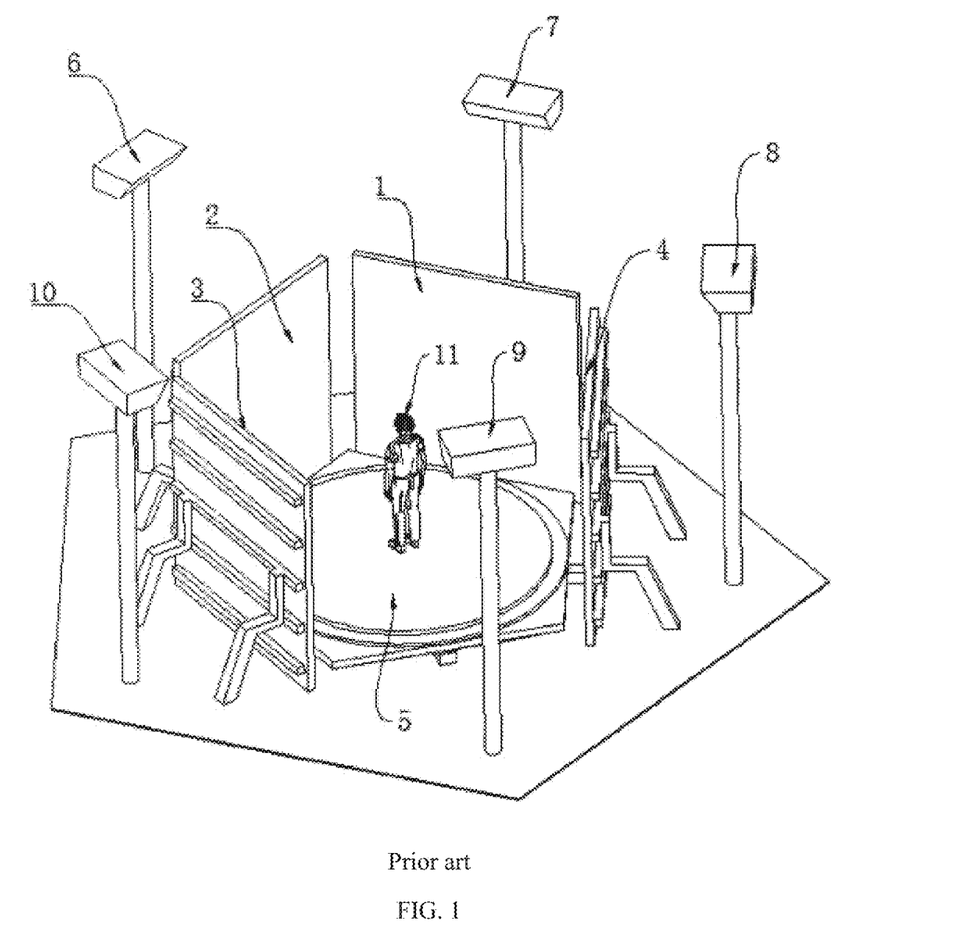
FIG. 1 is a structural schematic diagram of a CAVE system of the prior art.

As shown in FIG. 1, the CAVE system includes a projection array and a visual platform. The projection array includes a plurality of optical machines 6-10, and the visual platform includes a plurality of visual planes 1-5. The visual plane is a projection screen. In an example of the CAVE system, the projection array includes five optical machines, and the five optical machines are arranged in a pentagonal shape. The visual planes include four horizontal visual projection screens 1-4 and one bottom visual projection screen 5, and the five optical machines are projected to five planes of the visual planes, respectively. Five optical machines are connected with a data host to form a projection image, respectively, and the user 11 stands on the bottom visual projection screen 5 during the usage. A sight line of the user in the present invention generally only aims at the horizontal visual projection screens 1-4.

At present, the interior of a common optical machine has only one set of optical engines which are equipped with one lens. Limited by Texas Instruments DLP technology, at present, the highest resolution output of a single optical machine is 4 k (i.e., resolution is 3840×2160), and the price is quite high. Since the optical machine with 4K output has just come out, it belongs to a test stage. There is not a plurality of selected types for the throw ratio, that is, there is not a plurality of focal length lenses to choose. If ultra-high resolution output with a resolution of more than 4K needs to be achieved, a plurality of single optical machines should be subjected to hardware fusion or software fusion. However, drawbacks of the fusion way of the projection equipment in the prior art are as follows, firstly, the resolution outputted by a single set of optical engine equipped by the single optical machine is limited. For example, the resolutions of the common optical machines on the market is 1080*720 and 1920×1080. The resolution of some single high-end optical machines can achieve 4K (3840×2160), while the price is high. Currently, there is no single optical machine on the market which achieves four screen output with 4K. Secondly, mutual fusion between a plurality of single optical machines is performed, which cannot be commercialized and industrialized at all. Moreover, each of the optical machines is an independent structure, resulting in changes in the relative position between the optical machines after a long time, which directly affects the splicing and fusion of the image. Thirdly, for the optical machines with the same parameters, the hardware difficulty and the price of the optical machines with short focal length are higher than those of the normal focal length.

SUMMARY

In the technical solution of the present invention, the technical problems to be solved are how to provide a fusion projection way based on a plurality of single optical machines to solve the problem that the prior art is limited by the resolution of the projection screen of the optical machine and how to achieve optimizing image quality.

To solve above-mentioned technical problems, the technical solution of the present invention provides a projection method for achieving short focal length circular-screen output based on multiple optical machines. Based on a CAVE system, the CAVE system includes a visual platform and a projection array, the visual platform includes a plurality of visual planes, and the projection array includes a plurality of optical machines. The projection method includes the following steps:

setting a plurality of optical machines corresponding to one visual plane;

according to a percentage of a fusing zone formed when projection of the optical machines intersects each other and is projected to the corresponding visual plane and an expected screen ratio, calculating a value range of a throw ratio of the optical machines corresponding to the visual plane;

obtaining setting parameters of each optical machine based on the value range of the throw ratio of each optical machine; and according to the setting parameters of the optical machines and a projection area of an optical path coverage range of the optical machines on the corresponding visual plane, obtaining a spatial position and a rotation angle range when the optical machines are projecting.

Optionally, setting a plurality of optical machines corresponding to one visual plane may include: the one visual plane is set to be projected by four optical machines simultaneously.

Optionally, the value range of the throw ratio of the optical machine corresponding to the visual plane may be calculated based on the following formula:

setting the throw ratio of the optical machine as A, the expected projection screen ratio projected to the visual plane as S, a height from this optical machine to ground as Z, the percentage of the fusing zone formed when projected images of this optical machine and other optical machines intersect each other as P, a wall width of the visual plane corresponding to the optical machine as W, a wall height as H, and a horizontal distance from the optical machine to the corresponding visual plane as D, then the throw ratio A of the optical machine meets the following formula simultaneously:

$$(D/A) \times 2 >= W \times (1+4 \times P); \text{ and}$$

$$(D/A)/S \times 2 >= H \times (1+3 \times P).$$

Optionally, the setting parameters of each optical machine may include: the throw ratio determined according to the value range of the throw ratio of the optical machines and the screen ratio.

Optionally, the projection area of the optical path coverage range of the optical machines on the corresponding visual plane may be a visible projection area formed when the optical machines are projected to the corresponding visual plane during projection.

Optionally, according to the setting parameters of the optical machines and the projection area of the optical path coverage range of the optical machines on the corresponding visual plane, obtaining the spatial position and the rotation angle range when the optical machines are projecting may include:

according to an area of the optical machines corresponding to the visual plane, adjusting a spatial horizontal plane position and a rotation angle of the optical machines to calculate whether the optical path coverage range of the optical machines is within the area of the visual plane; and outputting the spatial horizontal plane position and the rotation angle range when the optical path coverage range of the optical machines is within the area of the visual plane.

To solve above-mentioned problems, the technical solution of the present invention further provides projection equipment for achieving short focal length circular-screen output based on multiple optical machines. Based on a CAVE system, the CAVE system includes a visual platform, the visual platform includes a plurality of visual planes, and the projection equipment includes a plurality of optical machines, the plurality of optical machines are set corresponding to one visual plane.

Optionally, one visual plane may be set to be projected by four optical machines simultaneously.

Optionally, the visual platform may include four horizontally arranged visual planes, and the projection equipment may include sixteen optical machines.

Optionally, the projection equipment may further include: an information output machine of spatial position and rotation angle range of the optical machine, the visual plane including a plurality of sub-planes with the same size during projection, each sub-plane corresponding to one optical machine and being projected, images of the optical machines projected to the corresponding sub-plane screen having a fusing zone there between, and the fusing zone being controlled within a predetermined width according to information on spatial position and rotation angle range of the optical machine.

To solve the above-mentioned problems, the technical solution of the present invention further provides a CAVE system, including: a visual platform and projection equipment as described above.

Beneficial effects of the technical solution of the present invention include but are not limited to the following:

The technical solution of the present invention provides an integrated optimization method for the optical machine, which can achieve four ultra-high resolution output with 4 k based on the existing common optical hardware with 2 k output. The conventional single optical machine and single optical machine system are changed to achieve one-to-many integration mode of multiple optical machine components in a single optical machine and complete video and image playback with ultra-high resolution. The conventional design way for hardware is completely changed, i.e. the single optical machine with high resolution output is achieved in the optical element based on the single optical machine. Through the integration of a plurality of optical machines, the video playback with high resolution which cannot be achieved by the conventional single optical machine can be realized at present.

In a preset scene, sixteen optical machines with general resolution of 1920×1080 are highly integrated to realize a multi-optical machine with four high-resolution projection images of 3840×2160. Without changing the interior optical element in the optical lens, the throw ratio is reduced by one times, and the normal focal length is converted to the short focal length.

BRIEF DESCRIPTION OF THE DRAWINGS

By reading and referring to detailed descriptions of the following drawings to non-limiting embodiments, other features, objectives, and advantages of the present invention will become more obvious.

DETAILED DESCRIPTION

As described in the background, the prior art cannot break through the limitation of a single machine outputting four images and videos with 4 k resolution, and cannot improve the quality of the projected image. The technical solution of the present invention aims to fully improve the above-mentioned projection resolution. The present invention also aims to use the basic parameters of the optical machine achieve the high-resolution projection and achieve an optimization effect that the focal length (throw ratio) of the whole machine is reduced by half compared to the lens focal length (throw ratio) of an internal single optical machine at the same time, which further improves the projected image quality. Through the design of the optical machine array at a component level, the technical solution of the invention adopts sixteen optical machines with resolution of 2K, achieving single equipment that the volume of the present invention is only ¼ of that in the existing solution. The power consumption of the present invention is only half of that in the existing solution. The installation and deployment are simple, the frame (4K×4) is large and panoramic, and the projection is seamless.

In order to better illustrate the technical solution of the present invention, the present invention will be further described with reference to the accompanying drawings.

Figure 2:
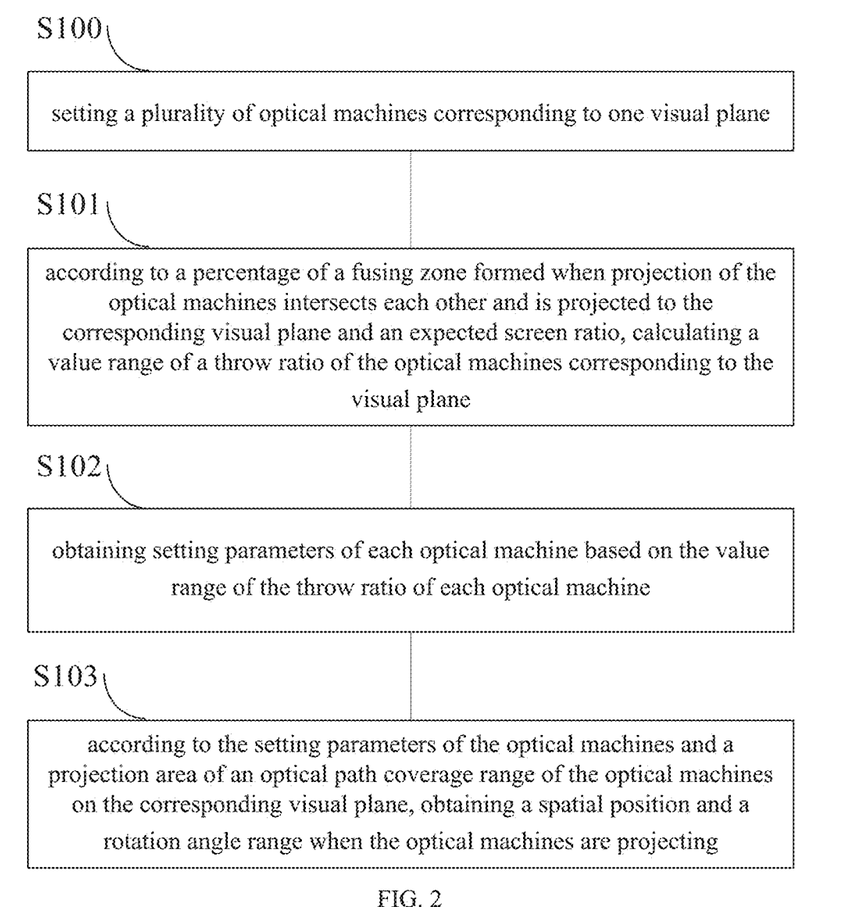
FIG. 2 is a flow schematic diagram of a projection method for achieving short focal length circular-screen output based on multiple optical machines provided by the technical solution of the present invention.

Referring to a projection method for achieving short focal length circular-screen output based on multiple optical machines shown in FIG. 2, based on a CAVE system, the CAVE system includes a visual platform and a projection array, the visual platform includes a plurality of visual planes, and the projection array includes a plurality of optical machines. The projection method includes the following steps:

S100, setting a plurality of optical machines corresponding to one visual plane;

S101, according to a percentage of a fusing zone formed when projection of the optical machines intersects each other and is projected to the corresponding visual plane and an expected screen ratio, calculating a value range of a throw ratio of the optical machines corresponding to the visual plane;

S102, obtaining setting parameters of each optical machine based on the value range of the throw ratio of each optical machine; and S103, according to the setting parameters of the optical machines and a projection area of an optical path coverage range of the optical machines on the corresponding visual plane, obtaining a spatial position and a rotation angle range when the optical machines are projecting.

Figure 3:
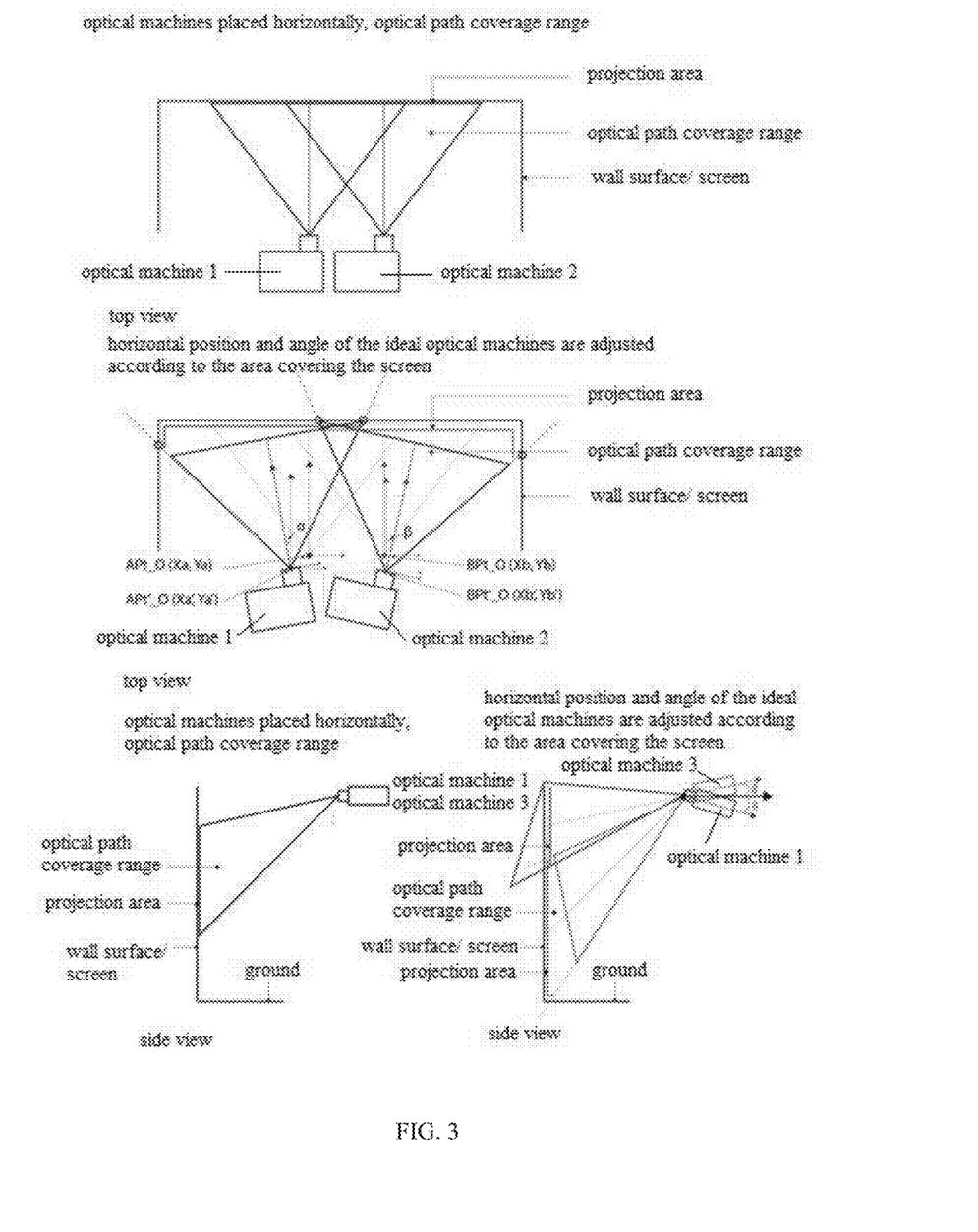
FIG. 3 is a planar schematic diagram of obtaining setting parameters, a spatial position and a rotation angle range of each optical machine when the optical machines are projecting according to each two optical machines in the four optical machines corresponding to the same visual plane provided by the technical solution of the present invention.
Figure 4:
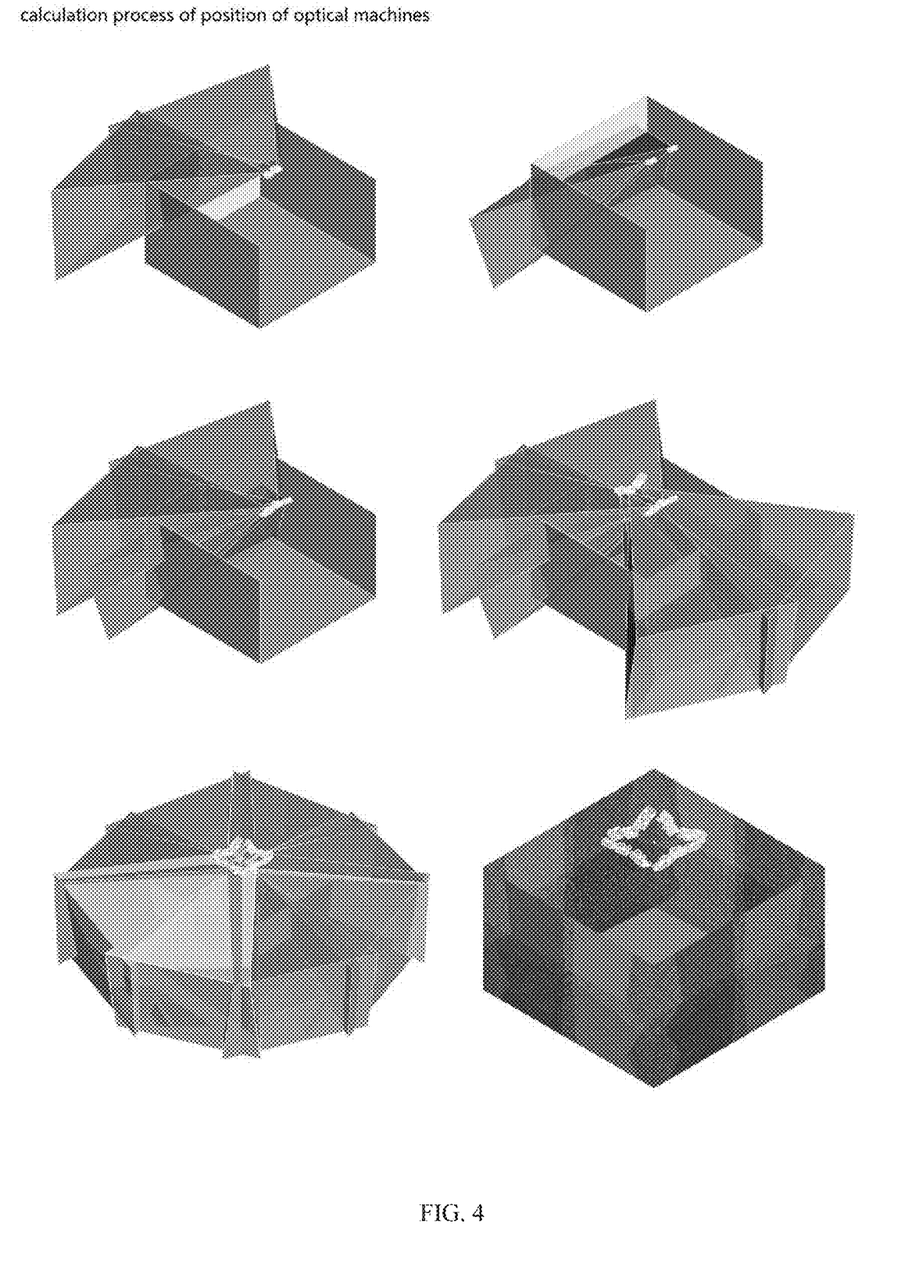
FIG. 4 is a three-dimensional schematic diagram of obtaining setting parameters, a spatial position and a rotation angle range of each optical machine when the optical machines are projecting according to each two optical machines in the four optical machines corresponding to the same visual plane provided by the technical solution of the present invention.
Figure 6:
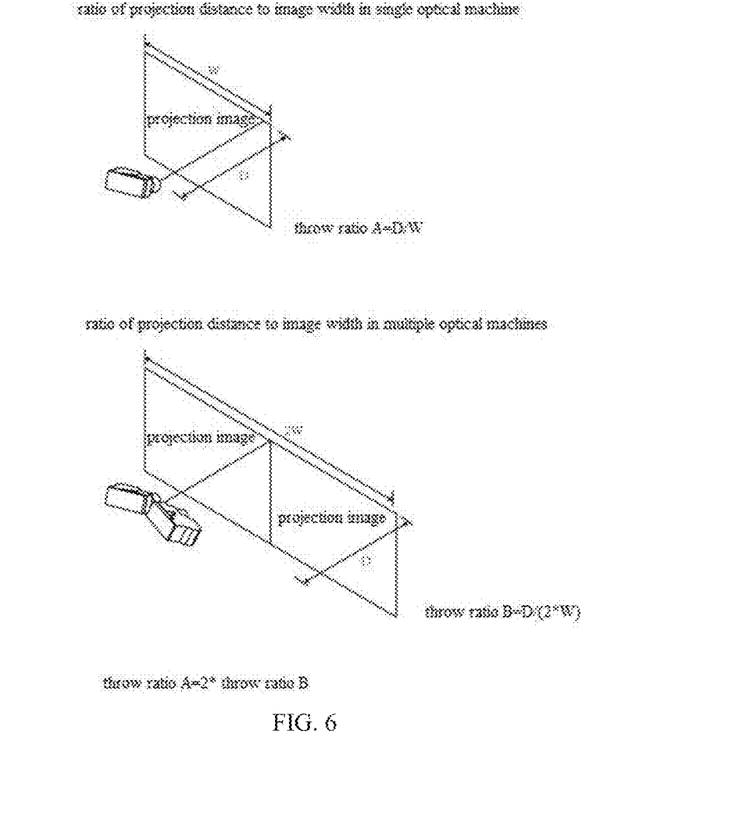
FIG. 6 is a schematic diagram of an algorithm for obtaining a throw ratio of the optical machine provided by the technical solution of the present invention.
Figure 7:
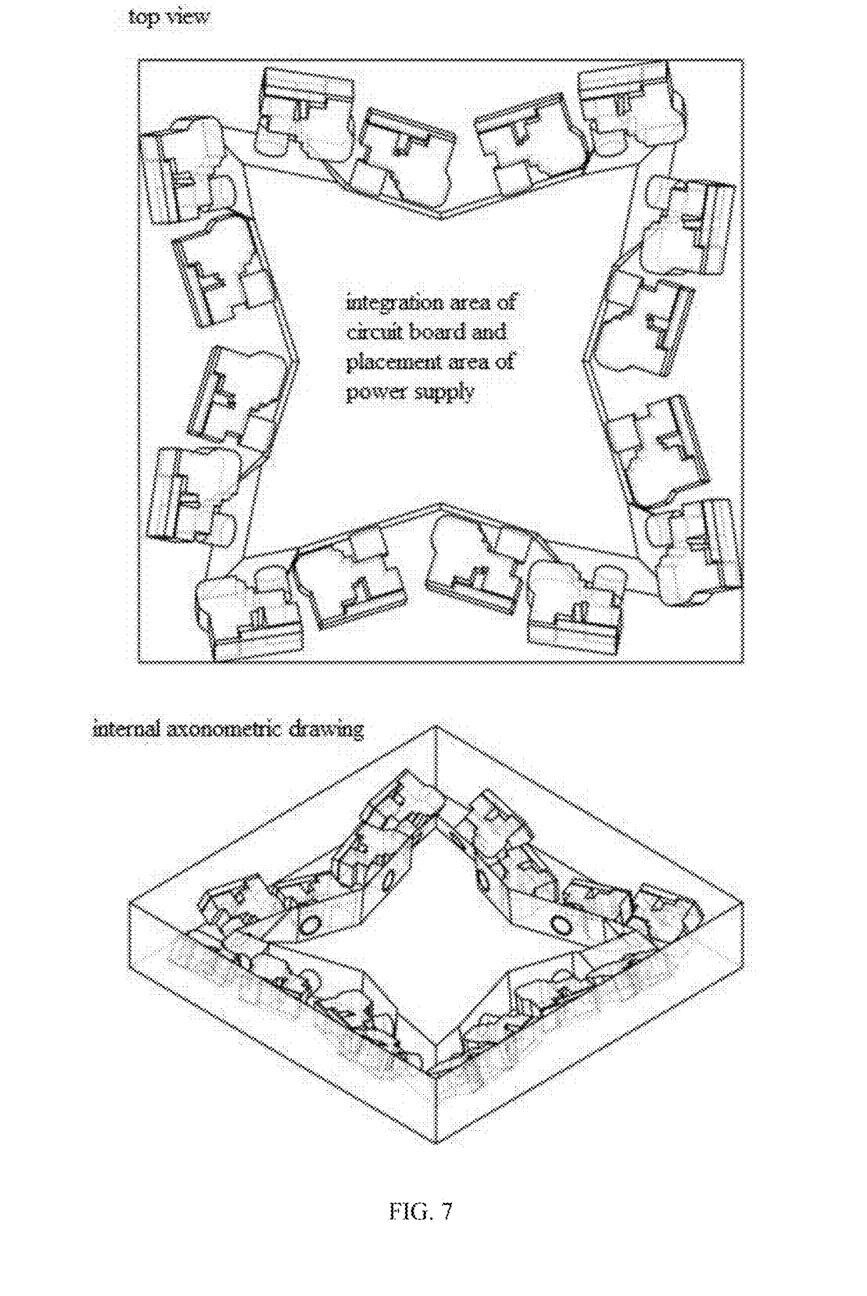
FIG. 7 is a top view and an internal axonometric drawing of projection equipment provided by the technical solution of the present invention.
Figure 8:
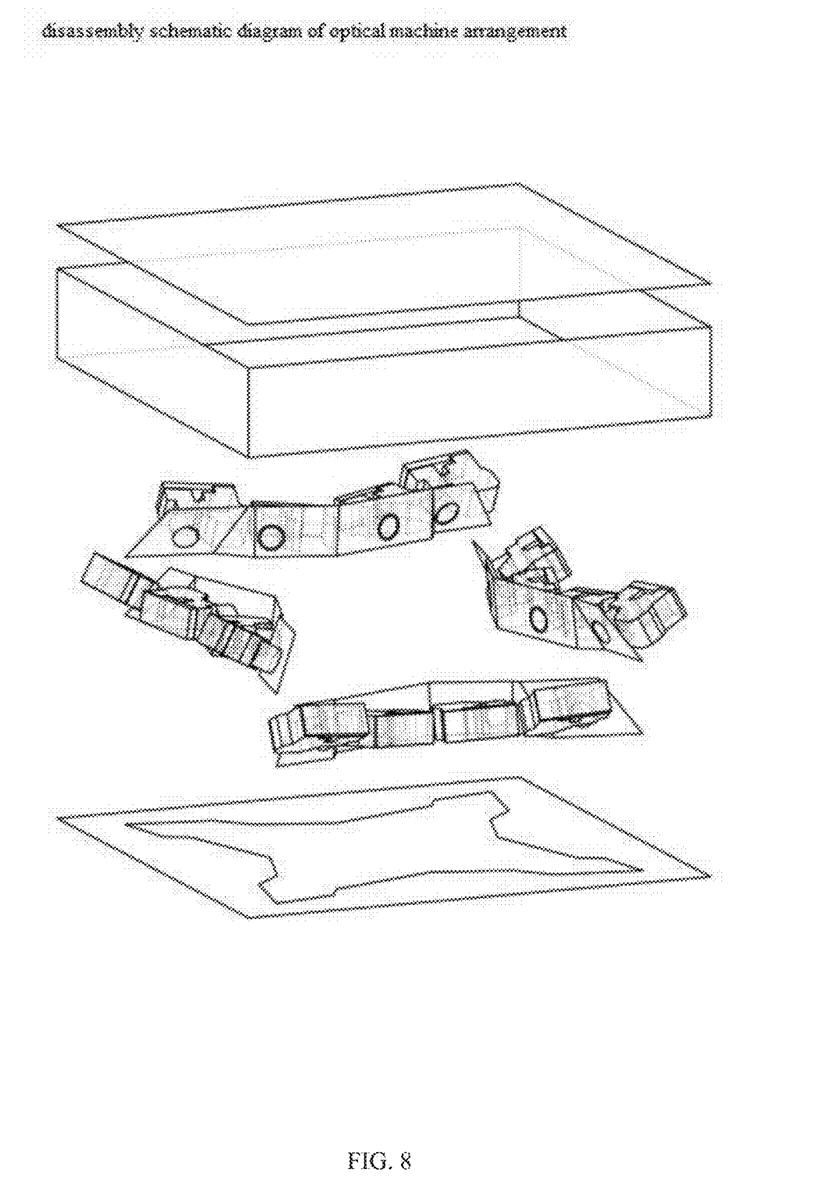
FIG. 8 is a disassembly schematic diagram of an optical machine arrangement of the projection equipment provided by the technical solution of the present invention.
Figure 9:
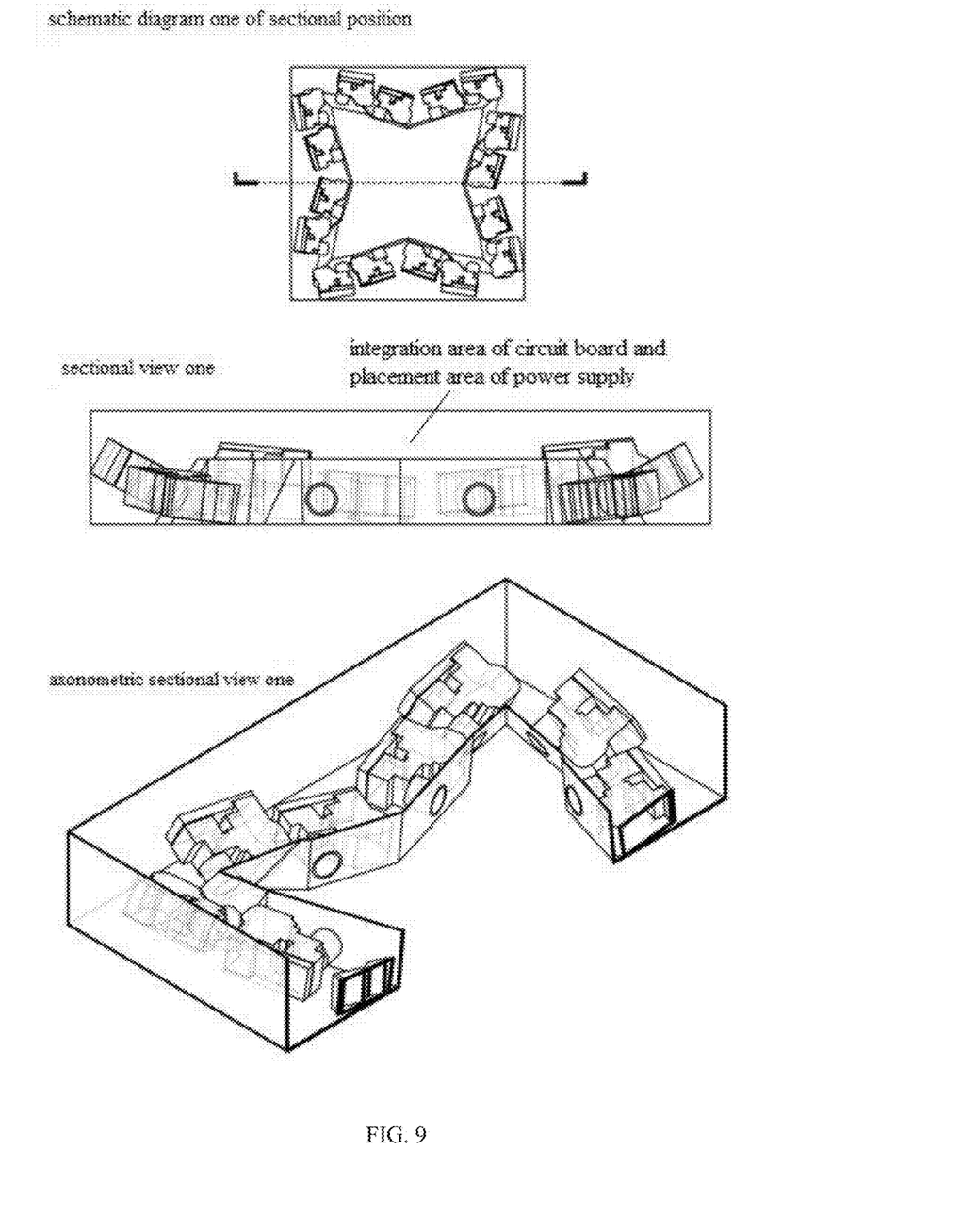
FIG. 9 and FIG. 10 are a plurality of sectional schematic diagrams of the optical machine arrangement of the projection equipment provided by the technical solution of the present invention.
Figure 10:
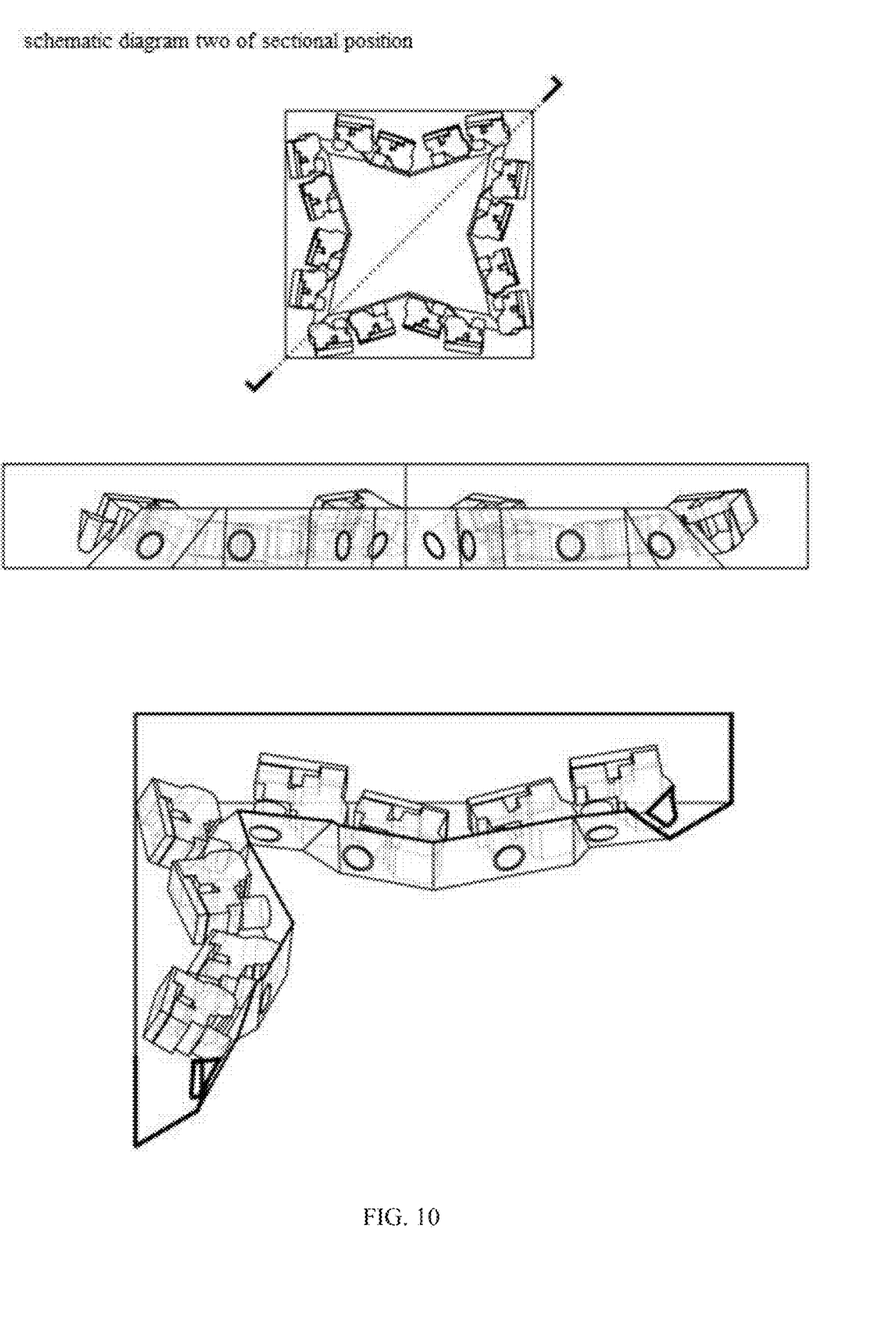

The following specific description will be made with reference to FIG. 3 to FIG. 10:

FIG. 3, FIG. 4 and FIG. 6 illustrate how to obtain the setting parameters, the spatial position, and the rotation angle range of each optical machine during the projection according to each two optical machines in the four optical machines corresponding to the same visual plane.

Figure 5:
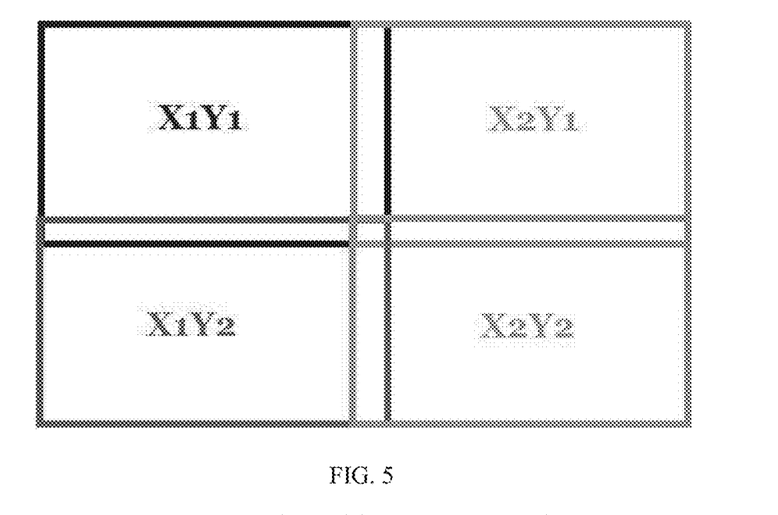
FIG. 5 is a schematic diagram of a projection screen formed when the four optical machines, corresponding to the same visual plane, are projecting provided by the technical solution of the present invention.

FIG. 5 illustrates projection screens (i.e., four sub-planes X1Y1, X1Y2, X2Y1, and X1Y2 in FIG. 5) and their fusing zones (i.e., four sub-planes in FIG. 5 overlapping to form vertical zones and horizontal zones) formed when the four optical machines corresponding to the same visual plane are projecting.

FIG. 7 to FIG. 10 illustrate specific structures of the projection equipment provided in the technical solution of the present invention, sixteen optical machines are arranged and displayed in the projection equipment.

It should be noted that as a preferred embodiment, the CAVE system in the present embodiment has four horizontal visual planes, in each of the horizontal visual planes, the projection equipment consists of sixteen optical machines, and each horizontal visual plane corresponds to four optical machines to form a projection screen with 4K effect. However, it should be understood that, other embodiments can be implemented according to this setting principle. However, no matter what the number of the visual planes and the number of the corresponding optical machines are, they should be included in the scope of the technical solution of the present invention.

Referring to the above-mentioned drawings, according to S100, setting a plurality of optical machines corresponding to one visual plane includes: the visual plane is set to be projected by four optical machines simultaneously.

According to S101, the value range of the throw ratio of the optical machines corresponding to the visual plane is calculated based on the following formula:

setting the throw ratio of the optical machine as A, the expected projection screen ratio projected to the visual plane as S, a height from this optical machine to ground as Z, the percentage of the fusing zone formed when projected images of this optical machine and other optical machines intersect each other (i.e., the percentage of the area of the fusing zone of one projected image to the area of the projected image) as P, a wall width of the visual plane corresponding to the optical machine as W, a wall height as H, and a horizontal distance from the optical machine to the corresponding visual plane as then the throw ratio A of the optical machine meets the following formula simultaneously:

$$(D/A) \times 2 >= W \times (1+4 \times P); \text{ and}$$

$$(D/A)/S \times 2 >= H \times (1+3 \times P).$$

According to S102, the setting parameters of each optical machine includes: the throw ratio determined according to the value range of the throw ratio of the optical machine and the screen ratio. In addition to the above-mentioned parameters, the setting parameters of other optical machines can undoubtedly deduce from the above-mentioned parameters, which should also be included in the above-mentioned setting parameters of the optical machines.

According to S103, the projection area of the optical path coverage range of the optical machine on the corresponding visual plane is a visible projection area formed when the optical machines are projected to the corresponding visual plane. According to the setting parameters of the optical machines and the projection area of the optical path coverage range of the optical machine on the corresponding visual plane, obtaining the spatial position and the rotation angle range when the optical machines are projecting includes:

according to an area of the optical machines corresponding to the visual plane, adjusting a spatial horizontal plane position and a rotation angle of the optical machines to calculate whether the optical path coverage range of the optical machines is within the area of the visual plane; and outputting the spatial horizontal plane position and the rotation angle range when the optical path coverage range of the optical machines is within the area of the visual plane.

Based on the above-mentioned projection method according to the technical solution of the present invention, projection equipment for achieving short focal length circular-screen output based on multiple optical machines, referring to FIG. 7 to FIG. 10, includes a plurality of optical machines, and a plurality of optical machines set to correspond to one visual plane.

As an optional embodiment, one visual plane is set to be projected by four optical machines simultaneously. As another optional embodiment, the visual platform includes four horizontally arranged visual planes, and the projection equipment includes sixteen optical machines.

Not limited by the above-mentioned implementation way, in another implementation solution of the projection equipment, in addition to the above-mentioned structure, the projection equipment further includes: an information output machine of spatial position and rotation angle range of the optical machines.

When the above-mentioned projection equipment projects, the visual plane includes a plurality of sub-planes, the plurality of sub-planes have same sizes (referring to FIG. 5), and each sub-plane corresponds to one optical machine and is projected. Images of the optical machines being projected to the corresponding sub-plane screen have a fusing zone there between, and a width of the fusing zone is controlled within a predetermined width according to information of spatial position and rotation angle range of the optical machines.

How to control the width of the fusing zone in the predetermined width according to the information of spatial position and rotation angle range of the optical machines can refer to the content described in the projection method according to the technical solution of the present invention. That is, the width of the fusing zone can be limited within the predetermined width by determining the percentage of the fusing zone, so that the information of spatial position and rotation angle range of the optical machines is deduced from the solution described in the technical solution of the present invention, which is not described again here.

Based on the above-mentioned projection equipment, the technical solution of the present invention also innovates the CAVE system, the CAVE system includes: a visual platform and the projection equipment described in the technical solution of the present invention.

Embodiment

Considering FIG. 3, and FIG. 4 to FIG. 6, in the application of the technical solution of the present invention, the basic process includes three parts: a selection of the throw ratio of the optical machines, a calculation of the spatial position of the optical machines, and an output of an overall layout.

The selection of the throw ratio of the optical machines includes:

assuming the throw ratio as A, the screen ratio (width dividing height) as S, the height from the optical machine to the ground as Z, and the percentage of the fusing zone as P:

the calculation process being carried out one by one according to the wall surface (i.e. the visual plane in the present embodiment). One of the walls is selected. Assume that the width of the wall is W and the height of the wall is H, and the horizontal distance from the optical machine to the wall is D. There are four optical machines for projection on the wall. Referring to FIG. 5, the projection images of each two machines in the four optical machines intersect and the intersecting parts are fusing zones. In a horizontal direction, two optical machines projecting X1Y1 and X2Y1 images need to meet:

$$(D/A) \times 2 >= W \times (1 + 4 \times P); \text{ and}$$

In a vertical direction, two optical machines projecting the X1Y1 and X2Y1 images need to meet:

$$(D/A)/S \times 2 >= H \times (1 + 3 \times P).$$

Under a given condition that the wall height is W, the wall width is H, the screen ratio is S, the percentage of fusing zone is P, and the distance from the optical machine to the wall surface is D, the value range of the throw ratio A can be obtained according to the above-mentioned two formulas, such that the basic parameters such as the throw ratio and the screen ratio are taken as bases for choosing the optical machines.

Similarly, the value ranges of the throw ratios A of the two optical machines of X1Y2 and X2Y2 can be obtained. The basic parameters such as the throw ratio and the screen ratio are taken as bases for choosing the optical machines.

Conditions of other wall surfaces can be deduced like this in turn.

The calculation of the spatial position of the optical machine includes:

referring to FIG. 3, the position of the optical machine 1 is inversely deduced from the projection area of the optical path coverage range on the screen to obtain an ideal position Apt'_O (Xa',Ya') and a rotation angle $\alpha$ on the horizontal plane of the coordinate optical machine 1. Similarly, an ideal position Bpt'_O (Xb',Yb') and an angle $\beta$ are obtained.

Similarly, on the vertical plane, the side view illustrates that a rotation angle $\theta$ between the optical machine and the horizontal plane is obtained according to the projection area.

A result of the output of the overall layout can refer to FIG. 7 to FIG. 10. By calculating of the spatial position of the optical machines and the transformation of the throw ratio, combining with restrictions such as the physical size and the spatial condition of the projected optical path and so on, the equipment overall is arranged and optimized, and the construction meeting the requirement of the size design is selected and output. Finally, the spatial positions and the special rotation angles of all sixteen optical machines are output.

Although the present invention has been described in considerable detail with reference to certain preferred embodiments thereof, it should be understood that the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A projection method for achieving short focal length circular-screen output based on multiple optical machines, wherein the projection method is based on a cave automatic virtual environment (CAVE) system, wherein the CAVE system comprises a visual platform and a projection array, wherein the visual platform comprises a plurality of visual planes, wherein the projection array comprises a plurality of optical machines, and wherein the projection method comprises the following steps:

setting the plurality of optical machines corresponding to one of the plurality of visual planes;

according to a percentage of a fusing zone and an expected screen ratio, calculating a value range of a throw ratio of each of the plurality of optical machines corresponding to the one of the plurality of visual planes; wherein the fusing zone is formed when projection of the plurality of optical machines intersects each other and are projected to the corresponding one of the plurality of visual planes;

obtaining setting parameters of each of the plurality of optical machines based on the value range of the throw ratio of each of the plurality of optical machines; and according to the setting parameters of the each of the plurality of optical machines and a projection area of an optical path coverage range of each of the plurality of optical machines on the corresponding one of the plurality of visual planes, obtaining a spatial position and a rotation angle range when each of the plurality of optical machines is projecting.

2. The projection method for achieving short focal length circular-screen output based on multiple optical machines according to claim 1, wherein setting the plurality of optical machines corresponding to one of the plurality of visual planes comprises: the one of the plurality of visual planes is set to be projected by four optical machines simultaneously.

3. The projection method for achieving short focal length circular-screen output based on multiple optical machines according to claim 1, wherein the value range of the throw ratio of each of the plurality of optical machines corresponding to the one of the plurality of visual planes is calculated based on the following formula:

setting the throw ratio of one of the plurality of optical machines as an expected projection screen ratio projected to the one of the plurality of visual planes as S, a height from the one of the plurality of optical machines to ground as Z, the percentage of the fusing zone formed when projected images of the one of the plurality of optical machines and the other of the plurality of optical machines intersect each other as P, a wall width of the one of the plurality of visual planes corresponding to the one of the plurality of optical machines as W, a wall height as H, and a horizontal distance from the one of the plurality of optical machines to the corresponding one of the plurality of visual planes as D, then the throw ratio A of the one of the plurality of optical machines meets the following formula simultaneously:

$(D/A) \times 2 >= W \times (1 + 4 \times P)$; and $(D/A)/S \times 2 >= H \times (1 + 3 \times P)$.

4. The projection method for achieving short focal length circular-screen output based on multiple optical machines according to claim 1, wherein the projection area of the optical path coverage range of each of the plurality of optical machines on the corresponding one of the plurality of visual planes is a visible projection area, and the visible projection area is formed when each of the plurality of optical machines is projected to the corresponding one of the plurality of visual planes.

5. The projection method for achieving short focal length circular-screen output based on multiple optical machines according to claim 1, wherein according to the setting parameters of each of the plurality of optical machines and the projection area of the optical path coverage range of each of the plurality of optical machines on the corresponding one of the plurality of visual planes, obtaining the spatial position and the rotation angle range when each of the plurality of optical machines is projecting comprises:

according to an area of each of the plurality of optical machines corresponding to the one of the plurality of visual planes, adjusting a spatial horizontal plane position and a rotation angle of each of the plurality of optical machines to calculate whether the optical path coverage range of each of the plurality of optical machines is within an area of the one of the plurality of visual planes; and outputting the spatial horizontal plane position and the rotation angle range when the optical path coverage range of each of the plurality of optical machines is within the area of the one of the plurality of visual planes.

6. A projection equipment for achieving short focal length circular-screen output based on multiple optical machines, wherein the projection equipment is based on a cave automatic virtual environment (CAVE) system, wherein the CAVE system comprises a visual platform, wherein the visual platform comprises a plurality of visual planes, wherein the projection equipment comprises a plurality of optical machines, and wherein the plurality of optical machines are set corresponding to one of the plurality of visual plane; an information output machine of spatial position and rotation angle range of the plurality of optical machines, each of the plurality of visual planes comprising a plurality of sub-planes with same sizes during projection, each of the plurality of sub-planes being projected and corresponding to one of the plurality of optical machines, and wherein a fusing zone is provided between images of the plurality of optical machines projected to the corresponding plurality of sub-planes, and the fusing zone is controlled within a predetermined width according to information of spatial position and rotation angle range of the plurality of optical machines.

7. The projection equipment according to claim 6, wherein the one of the plurality of visual planes is set to be projected by four optical machines simultaneously.

8. The projection equipment according to claim 7, wherein the visual platform comprises four horizontally arranged visual planes, and the projection equipment comprises sixteen optical machines.

9. A cave automatic virtual environment (CAVE) system, comprising: a visual platform and a projection equipment; wherein the projection equipment is based on a CAVE system, wherein the CAVE system comprises a visual platform, wherein the visual platform comprises a plurality of visual planes, and wherein the projection equipment comprises a plurality of optical machines, the plurality of optical machines are set corresponding to one of the plurality of visual planes; an information output machine of spatial position and rotation angle range of the plurality of optical machines, each of the plurality of visual planes comprising a plurality of sub-planes with same sizes during projection, each of the plurality of sub-planes being projected and corresponding to one of the plurality of optical machines, and wherein a fusing zone is provided between images of the plurality of optical machines projected to the corresponding plurality of sub-planes, and the fusing zone is controlled within a predetermined width according to information of spatial position and rotation angle range of the plurality of optical machines.

10. The cave automatic virtual environment (CAVE) system according to claim 9, wherein the one of the plurality of visual planes is set to be projected by four optical machines simultaneously.

11. The cave automatic virtual environment (CAVE) system according to claim 10, wherein the visual platform comprises four horizontally arranged visual planes, and the projection equipment comprises sixteen optical machines.

* * * * *